United States Patent
Brunnecker et al.

(10) Patent No.: US 8,415,583 B2
(45) Date of Patent: Apr. 9, 2013

(54) CLAMPING APPARATUS FOR CLAMPING AT LEAST TWO COMPONENT PARTS

(75) Inventors: Frank Brunnecker, Memmelsdorf (DE); Holger Aldebert, Zirndorf (DE); Andreas Kraus, Fürth (DE)

(73) Assignee: LPKF Laser & Electronics AG, Garbsen (DE)

( * ) Notice: Subject to any disclaimer, the term of this patent is extended or adjusted under 35 U.S.C. 154(b) by 0 days.

(21) Appl. No.: 12/593,058

(22) PCT Filed: Apr. 10, 2008

(86) PCT No.: PCT/EP2008/002808
§ 371 (c)(1),
(2), (4) Date: Feb. 17, 2010

(87) PCT Pub. No.: WO2008/125263
PCT Pub. Date: Oct. 23, 2008

(65) Prior Publication Data
US 2010/0140232 A1   Jun. 10, 2010

(30) Foreign Application Priority Data

Apr. 17, 2007 (DE) .......................... 10 2007 018 385
Sep. 7, 2007 (DE) .......................... 10 2007 042 739

(51) Int. Cl.
*B25B 1/20* (2006.01)
*B25B 1/24* (2006.01)
*B23K 26/24* (2006.01)

(52) U.S. Cl.
USPC ........................................ 219/121.63; 269/37

(58) Field of Classification Search .................... 269/37; 219/121.63
See application file for complete search history.

(56) References Cited

U.S. PATENT DOCUMENTS

| 4,461,946 | A | * | 7/1984 | Kratschmer | ............. 219/121.63 |
| 5,049,720 | A | | 9/1991 | Fang et al. | |
| 5,731,566 | A | * | 3/1998 | Steinhart | .................. 219/121.63 |
| 5,893,959 | A | | 4/1999 | Muellich | |

FOREIGN PATENT DOCUMENTS

| DE | 195 10 493 | 10/1995 |
| DE | 199 24 469 | 11/2000 |
| JP | 2007-313821 | * 12/2007 |

* cited by examiner

Primary Examiner — Evan Pert
(74) Attorney, Agent, or Firm — McGlew and Tuttle, P.C.

(57) ABSTRACT

The invention relates to a clamping device for clamping at least two components (6, 7) in a radiation-protected machine tool, particularly in a laser welding device (1), comprising—a receptacle (18) for supporting the first component (6), —a clamping head (16) for applying a force to the second component (7) in order to generate clamping pressure at the joint surface (8, 9) between the two components (6, 7), —an inner clamping jaw (11) located within the peripheral beam path (10) of the machine tool, the jaw having a clamping surface (12) for internally clamping the components (6, 7), and—narrow connecting struts (15) for connecting the inner clamping jaw (11) to the external clamping head (16), said connecting struts (15) bridging the passage gap (7) in the clamping head (16) allowing access for the beam path (10) of the machine tool to the components (6, 7).

10 Claims, 5 Drawing Sheets

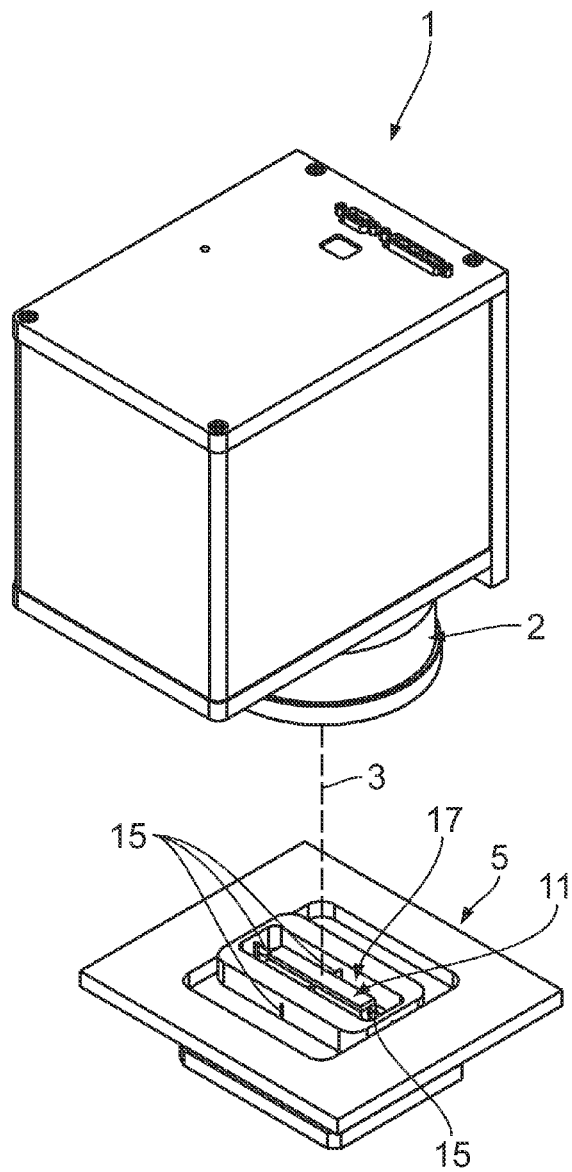
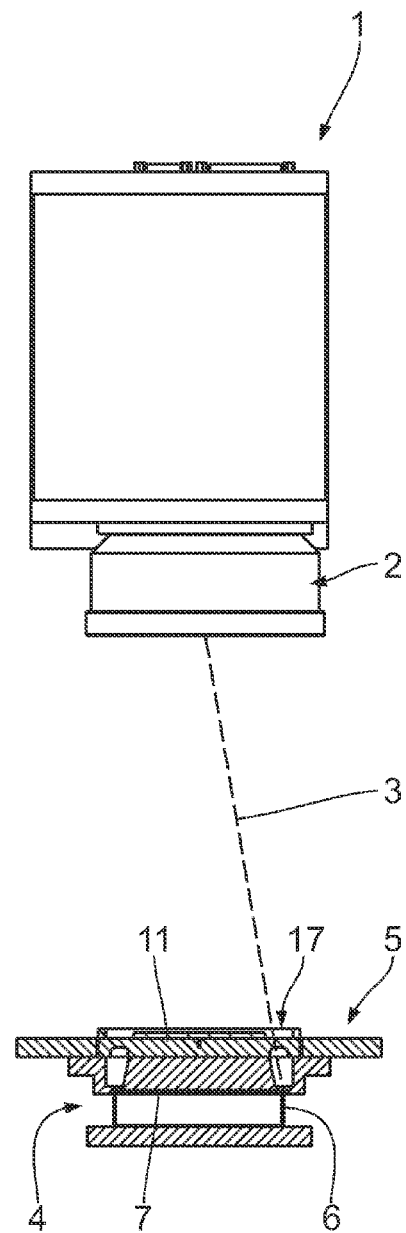
Fig. 1
Fig. 2

CLAMPING APPARATUS FOR CLAMPING AT LEAST TWO COMPONENT PARTS

FIELD OF THE INVENTION

The invention pertains to a clamping apparatus for clamping at least two component parts in a laser-based machine tool, especially in a laser welding device.

BACKGROUND ART

This type of clamping apparatus is known from a variety of printed publications. For example, DE 199 24 469 A1 shows a welding bracket for workpieces, especially for the laser transmission welding of faying surfaces made of plastic, where the faying surfaces are found on the circumferential lip around the edges of the two-part workpiece. One workpiece is held by a carrier for the suspension of the component. The second component is applied with a clamping chuck, which is held outside of the actual welding line for the application of clamping pressure to the faying surface.

For welding devices as per DE 95 10 493 A1, a pressure effect is caused by hydraulic, pneumatic, rolling or other downholders. Explicitly a pressure roller is released, which runs along the radiated area next to the laser beam. A considerable disadvantage of this process is that by moving the pressure roll a tangential force is applied along the direction of movement of the roll. This force causes tensions in the join partner penetrated by radiation. Furthermore, a damage of the surface may be caused by the pressure roll attached to the workpiece surface.

U.S. Pat. No. 5,049,720 A shows a laser welding device for the lid of a plastic container, where the lid is pressed on the container lip in the area of the weld seam by a double-ring-shaped clamping fixture. The gap between both clamping rings is thereby completely covered by a laser-transparent window, so that the area underneath is sealed when the lid is fixed, and additionally subjected to overpressure. This method is meant to make the lid sit evenly on the container. The laser beam passes through the window and the gap between the two rings and hits the welding area. The clamping pressure is brought about by a central pressure cylinder situated above the workpiece. This configuration is not meant for smaller components in need of welding.

In terms of the invention's background, a quick look should be taken at the primary area of use, namely transmission welding. Here, the transfer of the necessary laser power to the welding area is achieved by the laser beam being run through the lid of one component, which is transparent or at least translucent for the laser beam's wave range. The laser energy is at least partly absorbed by the lower of the joining partners. The resulting heat causes the lower joining partner to partially melt; the first component is also partially melted through the heat transfer from the second component to the lid. A connection between the two joining partners results through the pressure on the welding area. The laser beam works its way along the weld seam.

To produce the pressure effect, DE 199 24 469 A1—which represents up-and-coming state-of-the-art technology—shows an outer clamping apparatus where the opposing clamping pressure on the joining partners is applied to one side of the weld seam. This leads to a one-sided strain on the radiated joining partner along the weld seam, which is a drawback for the welding quality. The pressure distribution diminishes toward the welded seam and can cause an outer deformation of the component. As such, strain can arise in plastic structures, which can cause cracks in or next to the weld seam after the melted portions have solidified.

Further, the outer clamping apparatus is hard to use when the components offer little or no material to which to attach it outside of the weld seam.

SUMMARY OF THE INVENTION

This invention's task, based on the above-described problems with the state-of-the-art technology, is to create a clamping apparatus with which two components that are to be fused can be universally clamped irrespective of their dimensions, which will obviate the need for the problematic outer clamping technology.

This problem is solved by the respective clamping fixtures being designed as an inner clamping fixture placed within the circulating beam path of the work beam of the machine tool having a clamping surface for the inner clamping of the components, a gap for the work beam separating the respective inner clamping fixture from the outer clamping chuck, and at least one narrow connecting strut being provided for connecting the inner clamping fixture to the outer clamping chuck, which at least one connecting strut beides the gap releasing the beam path of the machine tool to the components. The clamping apparatus is comprised of:

an inner clamping fixture placed within the circulating beam path of the machine that has a clamping surface to clamp the component from within, and narrow connecting struts to connect the inner clamping fixture with the outer clamping chuck, which bridge the gap in the clamping chuck that allows the beam path to pass from the machine to the components.

The invention proposes an inner clamping technology that has not been used until now in laser-based machines because of the shadowing effects connected with the clamping parts lying inside. In this light, the invention resulted from the discovery that marginal interruptions of the laser beam, such as those caused by the small connecting struts that fasten the inner clamping fixture to the exterior clamping chuck, are not appreciably detrimental to the weld seam. Because of the thermal conduction also taking place lengthwise along the welded seam, the areas shadowed by the connecting struts are also provided with adequate energy, so that a flawless melting and welding of the joining pair can be achieved.

Because of the inner clamping specific to the invention, especially in combination with the favored outer clamping, the clamping pressure distribution is much more homogeneous for the entire weld seam, which leads to less tension in and around the weld seam. This improves the weld seam's homogeneity and allows the desired welding results to be achieved using less laser power. This can also result in pulse time reduction during workpiece processing.

According to a further advantageous embodiment it is provided for the tension of three-dimensional components to create the inner tension by a plurality of individual clamping fixtures, each arranged on outer, individual clamping chucks by the connecting struts bridging the beam path. Preferably, the inner clamping fixtures together with the connecting struts each are part of a clamping lever which is admittable by means of a clamping drive, for example in the form of a piston cylinder drive.

Preferred designs, further attributes, details and advantages of the invention arise from specific demands and the following description of typical designs based on the attached drawings.

BRIEF DESCRIPTION OF THE DRAWINGS

FIG. 1 shows a perspective drawing of a laser welding device with a clamping apparatus, FIG. 2 shows a side view of the configuration depicted in FIG. 1.

DESCRIPTION OF THE PREFERRED EMBODIMENTS

As FIGS. 1 and 2 make clear, a laser welding device is made up of a laser welding head, denoted as a whole with 1, which is state-of-the-art in its construction and as such must not be further described. The laser welding head 1 may be designed as a scanner system or as a moveable contour welding head.

Through a scanning device the laser beam marked with dashes in FIG. 2 passes over a defined beam path (see FIGS. 3 and 6) to process the workpiece held by the clamping apparatus, which will be described below.

Figure 3:
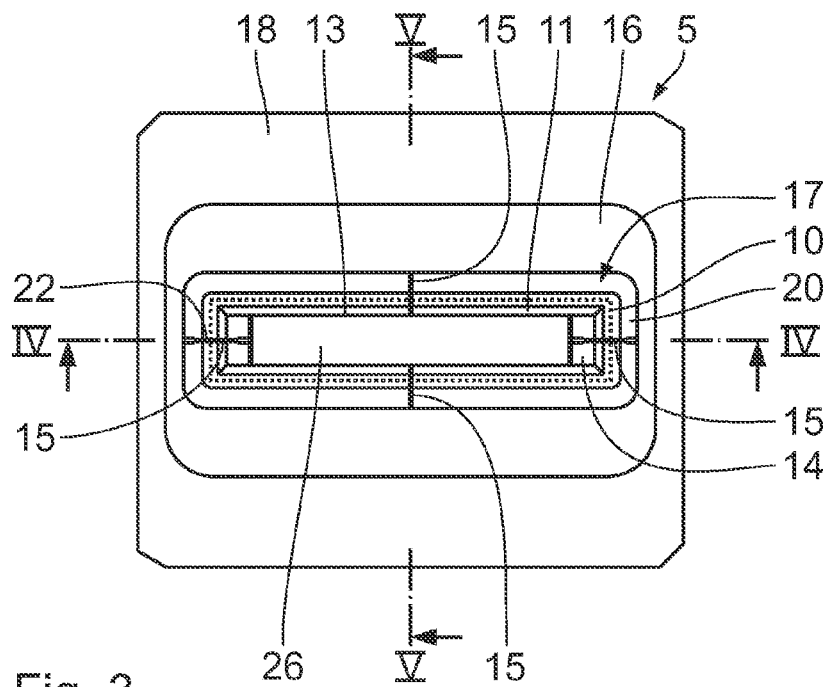
FIG. 3 shows a top view of a clamping apparatus with the inner clamping of a component.
Figure 4:
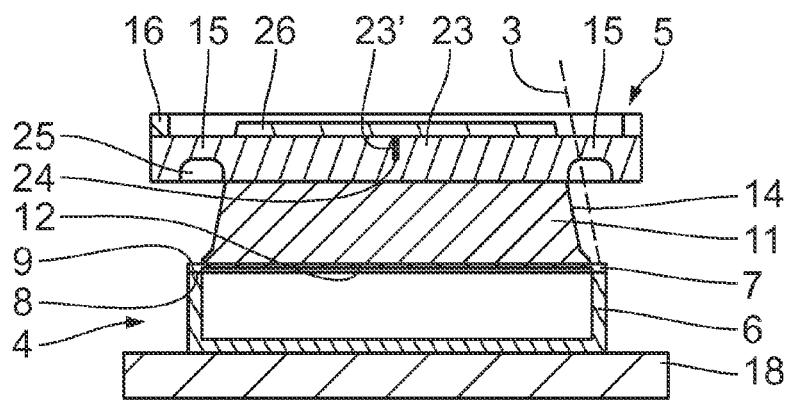
FIGS. 4 and 5 show sectional representations of the clamping apparatus corresponding to line of intersection IV-IV and V-V, respectively, according to FIG. 3.
Figure 5:
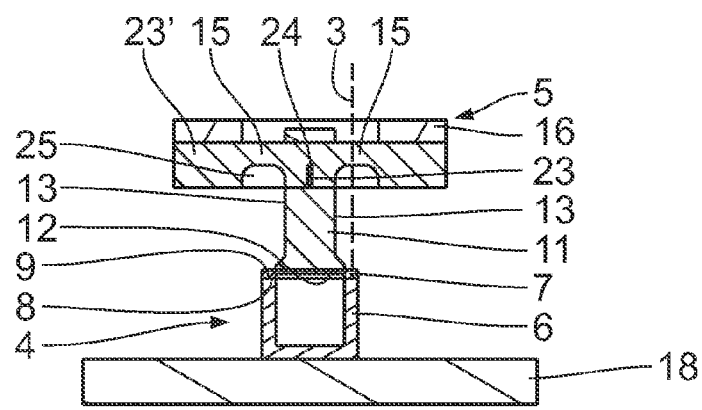

FIGS. 3 to 5 demonstrate the configuration of a clamping apparatus for the exclusive inner clamping of the workpiece. The workpiece is made up of two components: one cuboid, top-open lower component and a lid that sits on top and is flush with the outer walls of the lower component. The latter is made up of a transmissive thermoplastic material for the wavelength of the laser beam, whereas the lower component is made of a laser-beam-absorbing and heat-transformable material. The laser beam can pass through the lid and, in the welding area composed of the lower rim of the lid and the upward leading edge of the lower component, cause the two components to melt together through the above-mentioned transmission welding procedure.

To clamp both components, the lower component is held in the workpiece carrier. The lid is provided inner clamping through the inner clamping fixture, which is within the dotted laser beam path illustrated in FIGS. 3 and 6. The inner clamping fixture is attached to the clamping chuck, which is suggested in FIGS. 3 to 5 in the form of a clamping ring, using connecting struts, which are situated in the center of the upper part of the length and cross sides. The connecting struts bridge the gap in the clamping chuck that permits the beam path from the laser welding head to the components.

They are, as can especially be seen in FIG. 3, fin-shaped, whereby the flat principal plane runs essentially parallel to the direction of the laser beam, and as such vertically. Further, this principal plane lies at a right angle to the beam path, so that the laser beam is only minimally shadowed. For special applications, a transversal arrangement of the connecting struts may be shown.

The shape of the clamping surface of the inner clamping fixture is—as seen in FIGS. 4 and 5—adjusted to the shape of the lid and as such to the weld seam to be applied in the welding area between the lower rim of the lid and the leading edge of the lower component. As such, the clamping pressure being applied by the clamping chuck is evenly dispersed through the lid to the lower component, which is counterbalanced by the workpiece carrier.

As further depicted in FIGS. 3 to 5, the surfaces of the inner clamping fixture facing the gap are inclined against the beam direction on the narrow cross sides and the respective surface of the clamping chuck, so that the gap extends conically against the beam direction of the laser beam. As such the laser beam can reach the welding area without hindrance, even at a flat angle, as is the case here when making a weld seam in the area of the narrow sides.

From the top view as per FIG. 3, cavities are visible on the flat sides of both of the connecting struts bridging the narrow sides. They serve to adjust the shape of the connecting struts to the caustic of the laser beam.

As can be seen from both sectional representations corresponding to FIGS. 4 and 5, the respective connecting struts—which run in one line and face opposite directions—are built on shared, strip-shaped metal sheets, which run along the entire inner clamping fixture and cross centrally in a coping. Each metal sheet is anchored to a ring-like clamping chuck on its outer ends. Further, in the gap the metal sheets exhibit cavities on their bottom edge, so that the amount of shadowing is minimized for laser beams that run diagonal to the metal sheets' plane. Both metal sheets are held by a lid at the top of the inner clamping fixture.

Figure 6:
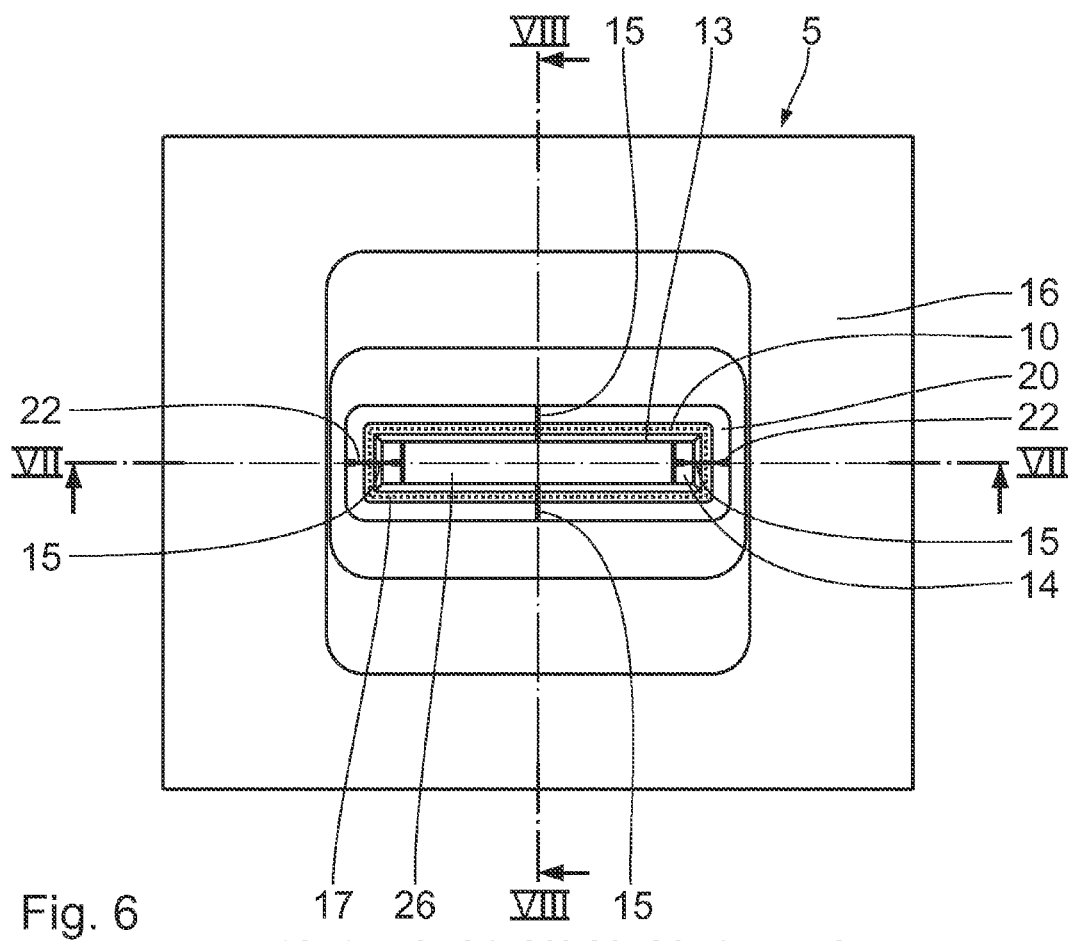
FIG. 6 shows a top view of a clamping apparatus with combined inner and outer clamping.
Figure 7:
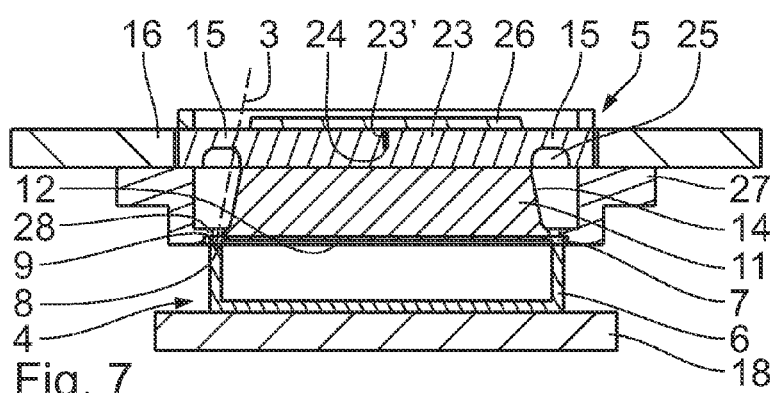
FIGS. 7 and 8 show sectional representations of the clamping apparatus corresponding to line of intersection VII-VII and VIII-VIII, respectively, according to FIG. 6, as well as FIGS. 9 and 10 show a side view and a top view of another embodiment of an inner clamping device composed of individual clamping fixtures.
Figure 8:
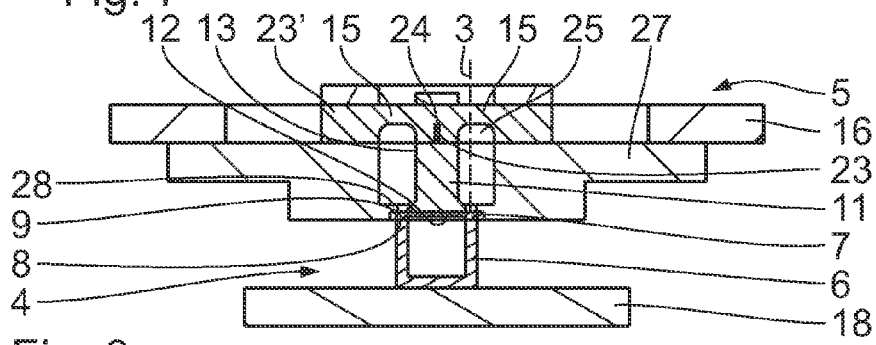

For the clamping apparatus design shown in FIGS. 6 to 8, the inner clamping is quasi unchanged compared to the design shown in FIGS. 3 to 5. Identical components are tagged with identical reference numbers and require no further explanation.

As opposed to FIGS. 3 to 5, the design shown in FIGS. 6 to 8 has in addition to the inner clamping device an outer clamping apparatus, which is realized through a clamping ring brought onto the lower side of the clamping chuck. This catches the workpiece from outside, fixing it at the rim of the lid from above by means of a fixing element that runs along the circumference of the inside of the clamping opening. Together with the aforementioned inner clamping, the welding area is clamped between the lower lid rim and the leading edge of the lower component on both sides of the beam path.

Figure 9:
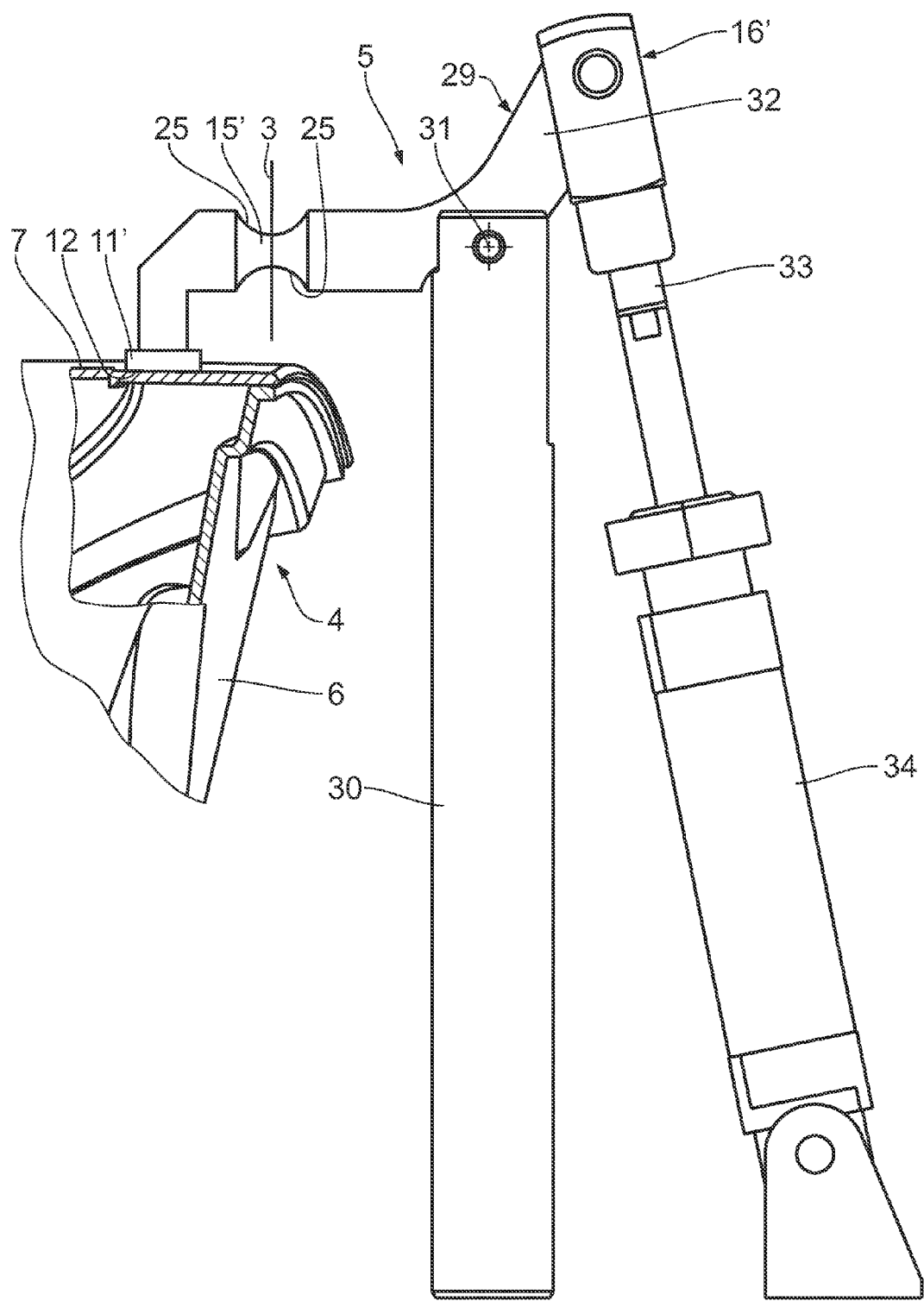
Figure 10:
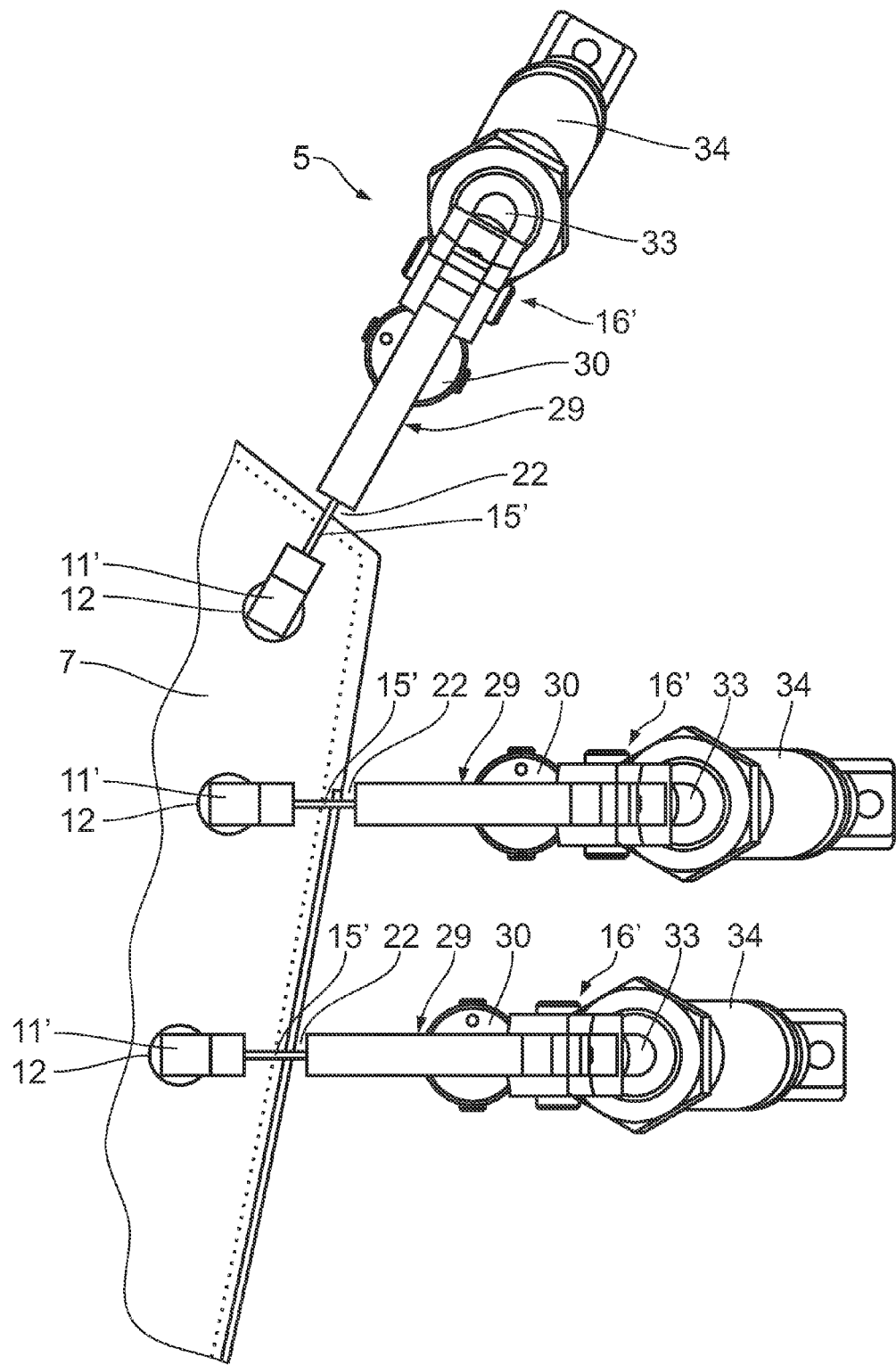

An inner clamping device is shown in FIGS. 9 and 10, in which a plurality of inner clamping fixtures 11' are applied for the rension of the lid 7 on the lower component 6. In turn, these inner clamping fixtures 11' are connected to the outer clamping chucks 16' of the clamping device by small, rack-like connecting struts 15'. By means of these connecting struts 15' formed in top view (FIG. 10) by cavities 22 of the clamping levers 29, the beam path 10 of the laser beam 3 is bridged. Further, an adaptation of the connecting struts 15' to the beam caustic results from their upper and lower cavities 25.

The clamping levers 29 themselves are pivotably mounted on supports 30 in an axis or rotation 31 arranged outside the workpiece reception not shown in greater detail. On its upwardly offset lever arm 32 averted from the inner clamping fixtures 11', the respective piston rod 33 of a piston cylinder drive 34 is hinged. By means of this piston cylinder drive 34 every single inner clamping fixture 11' may be charged in such a way that it charges the component to be clamped, namely the lid 7, from above within the weld seam to be created along the beam path 10 of the laser welding device against the lower component 6. By retracting the piston rod 33 the inner clamping maws 11' may be pivoted upwards and thus the workpiece 4 may be removed from the laser welding device.

Although, due to the rack-like connecting struts 15', the shadowing of the laser treatment beams is such marginal that an impairment of the weld seam to be created is not to be feared, for particularly high quality demands the respective clamping fixture 11' crossing the beam path may selectively be pivoted upwards by means of the piston cylinder drive 34.

Finally, with respect to all embodiments discussed above it is further to be noted that the clamping pressure may also be accomplished by charging the workpiece reception from below and thus driving the component to be clamped against the one- or multiple-piece inner clamping fixtures 11'. In this case, for example the piston cylinder drives 34 of the embodiment according to FIGS. 9 and 10 fall away.

The invention claimed is:

1. A clamping apparatus for clamping at least two component parts in a machine tool using a work beam, in particular a laser welding device, the clamping apparatus comprising:
 a carrier for mounting the first component; and
 at least one clamping chuck on which a respective clamping fixture is arranged for fixing the second component to bring clamping pressure to the joining face between both of the components, wherein:
  the respective clamping fixture is designed as an inner clamping fixture placed within the circulating beam path of the work beam of the machine tool having a clamping surface for the inner clamping of the components;
  a gap for the work beam separates the respective inner clamping fixture from the outer clamping chuck; and
  at least one narrow connecting strut is provided for connecting the inner clamping fixture to the outer clamping chuck, which at least one connecting strut bridges the gap releasing the beam path of the machine tool to the components.

2. A clamping apparatus according to claim 1, wherein the connecting struts are fin-shaped, whereby the flat principal plane runs essentially parallel to the direction of the machine's laser beam.

3. A clamping apparatus according to claim 1, wherein the clamping area of the inner clamping fixture runs parallel to the faying surface.

4. A clamping apparatus according to claim 1, wherein the gap extends conically in the opposite direction of the machine's beam.

5. A clamping apparatus according to claim 1, wherein the shape of the connecting struts is adapted to the caustic of the laser beam.

6. A clamping apparatus according to claim 1, wherein the clamping chuck has an outer clamping fixture placed outside of the circulating beam path of the machine with a clamping surface for outer clamping of the components.

7. A clamping apparatus according to claim 1, wherein at least one of said inner and outer clamping fixtures is made up of multiple parts.

8. A clamping apparatus according to claim 1, wherein connecting struts that make up the inner clamping fixture's mount are built on two crossing sheet metal strips embedded in the inner clamping fixture.

9. A clamping apparatus according to claim 1, wherein in particular for the clamping of three-dimensional components a plurality of individual inner clamping fixtures are each arranged on outer, individual clamping chucks by the connecting struts.

10. A clamping device according to claim 9, wherein the clamping chucks each comprise clamping levers holding the connecting struts, which, by means of a clamping drive, are preferably chargeable by means of a piston cylinder drive.

* * * * *

UNITED STATES PATENT AND TRADEMARK OFFICE
CERTIFICATE OF CORRECTION

| | | |
|---|---|---|
| PATENT NO. | : 8,415,583 B2 | Page 1 of 1 |
| APPLICATION NO. | : 12/593058 | |
| DATED | : April 9, 2013 | |
| INVENTOR(S) | : Brunnecker et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this
Fourth Day of June, 2013

Teresa Stanek Rea
*Acting Director of the United States Patent and Trademark Office*